US009820328B2

(12) United States Patent
Zhu et al.

(10) Patent No.: US 9,820,328 B2
(45) Date of Patent: Nov. 14, 2017

(54) APPARATUSES, METHODS, AND SYSTEMS TO REDUCE HANDOVER LATENCY IN AN INTEGRATED WIRELESS LOCAL AREA NETWORK AND CELLULAR NETWORK

(71) Applicant: Intel Corporation, Santa Clara, CA (US)

(72) Inventors: Jing Zhu, Portland, OR (US); Nageen Himayat, Fremont, CA (US); Alexander Sirotkin, Petach Tikva (IL)

(73) Assignee: Intel Corporation, Santa Clara, CA (US)

( * ) Notice: Subject to any disclaimer, the term of this patent is extended or adjusted under 35 U.S.C. 154(b) by 241 days.

(21) Appl. No.: 14/313,879

(22) Filed: Jun. 24, 2014

(65) Prior Publication Data

US 2015/0373608 A1    Dec. 24, 2015

(51) Int. Cl.
| | |
|---|---|
| *H04L 12/26* | (2006.01) |
| *H04W 76/04* | (2009.01) |
| *H04W 84/12* | (2009.01) |
| *H04W 36/14* | (2009.01) |
| *H04W 76/06* | (2009.01) |

(52) U.S. Cl.
CPC .......... *H04W 76/045* (2013.01); *H04W 36/14* (2013.01); *H04W 76/068* (2013.01); *H04W 84/12* (2013.01)

(58) Field of Classification Search
CPC ............................. H04W 36/24; H04W 84/12
USPC .................................. 370/216–228, 310–350
See application file for complete search history.

(56) References Cited

U.S. PATENT DOCUMENTS

| | | | |
|---|---|---|---|
| 2007/0173283 A1* | 7/2007 | Livet ................. | H04W 88/06 455/552.1 |
| 2011/0002262 A1* | 1/2011 | Wang ................. | H04L 1/1812 370/328 |
| 2013/0194991 A1 | 8/2013 | Vannithamby et al. | |
| 2013/0294307 A1 | 11/2013 | Johansson et al. | |

(Continued)

OTHER PUBLICATIONS

International Search Report and Written Opinion dated Aug. 3, 2015 from International Application No. PCT/US2015/027991.

(Continued)

*Primary Examiner* — Ricky Ngo
*Assistant Examiner* — Wei-Po Kao
(74) *Attorney, Agent, or Firm* — Schwabe, Williamson & Wyatt, P.C.

(57) ABSTRACT

Embodiments include apparatuses, methods, and systems to reduce handover latency in an integrated wireless local area network (WLAN) and wireless cellular network. In embodiments, a user equipment (UE) may communicate with a packet data network (PDN) gateway (P-GW) via the WLAN and/or the wireless cellular network. Various embodiments may provide monitoring circuitry to monitor one or more PDN connections between the P-GW and the UE over the WLAN, determine that the UE should be in a radio resource control (RRC)-Connected mode based on the monitored one or more PDN connections, and transmit an inactivity timer reconfiguration (ITR) message to request suspension of an inactivity timer associated with the UE. The monitoring circuitry may be included in the P-GW, a WLAN gateway, the UE, and/or another component of the network.

23 Claims, 8 Drawing Sheets

(56) References Cited

U.S. PATENT DOCUMENTS

| | | | |
|---|---|---|---|
| 2013/0329637 A1* | 12/2013 | Kodali | H04W 76/046 370/328 |
| 2014/0092799 A1 | 4/2014 | Jain et al. | |
| 2014/0099955 A1 | 4/2014 | Nukala et al. | |
| 2015/0201454 A1* | 7/2015 | Shukair | H04W 76/045 370/329 |
| 2016/0088671 A1* | 3/2016 | Bergstrom | H04W 76/045 370/338 |
| 2017/0064769 A1* | 3/2017 | Zhang | H04W 76/046 |

OTHER PUBLICATIONS

3GPP, "Technical Specification Group Services and System Aspects; Study on S2a Mobility based on GPRS Tunnelling Protocol (GTP) and Wireless Local Area Network (WLAN) access to the Enhanced Packet Core (EPC) network (SaMOG); Stage 2 (Release 12)," 3GPP TR 23.852 V12.0.0 (Sep. 2013), Lte Advanced, Sep. 12, 2013, 157 pages.

\* cited by examiner

APPARATUSES, METHODS, AND SYSTEMS TO REDUCE HANDOVER LATENCY IN AN INTEGRATED WIRELESS LOCAL AREA NETWORK AND CELLULAR NETWORK

FIELD

Embodiments of the present invention relate generally to wireless networks, and more particularly to reducing handover latency in an integrated wireless local area network and cellular network.

BACKGROUND

Many user equipments (UEs) communicate over a wireless cellular network and over a wireless local area network (WLAN). A packet data network (PDN) connection of the UE is typically started on or migrated to the WLAN to reduce traffic congestion on the wireless cellular network and/or provide a faster data connection. With no active PDN connections on the wireless cellular network, the UE may be placed in a radio resource control (RRC)-Idle mode with the wireless cellular network or detached from the wireless cellular network. However, if the PDN connection needs to be transferred from the WLAN to the wireless cellular network (e.g., if the WLAN fails or the UE moves out of a coverage area of the WLAN), the UE must first transition to the RRC-Connected mode with the wireless cellular network, thereby causing delay in the handover of the PDN connection.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

In the following detailed description, reference is made to the accompanying drawings that form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrases "A and/or B" and "A or B" mean (A), (B), or (A and B). For the purposes of the present disclosure, the phrase "A, B, and/or C" means (A), (B), (C), (A and B), (A and C), (B and C), or (A, B, and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. As used herein, "computer-implemented method" may refer to any method executed by one or more processors, a computer system having one or more processors, a mobile device such as a smartphone (which may include one or more processors), a tablet, a laptop computer, a set-top box, a gaming console, and so forth.

Figure 1:
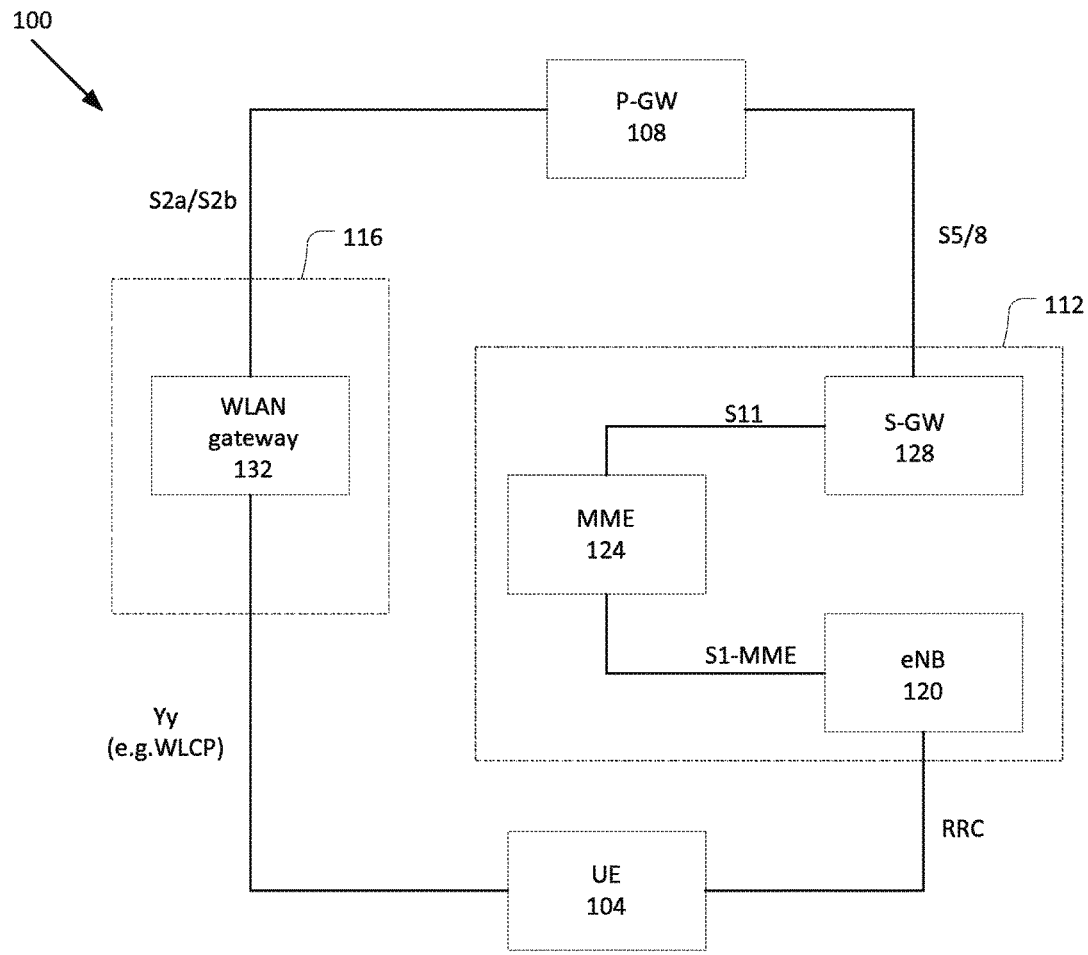
FIG. 1 schematically illustrates a network environment in accordance with various embodiments.

FIG. 1 schematically illustrates a network environment 100 in accordance with various embodiments. Network environment 100 (hereinafter "network 100") may include a user equipment (UE) 104 and a packet data network gateway (P-GW) 108. The UE 104 may communicate with the P-GW 108 via a wireless cellular network 112 and/or a wireless local area network (WLAN) 116.

The wireless cellular network 112 may be an access network of a 3rd Generation Partnership Project (3GPP) long-term evolution (LTE) network such as evolved universal mobile telecommunication system (UMTS) terrestrial radio access network (E-UTRAN). The wireless cellular network 112 may include a base station, e.g., evolved node base station (eNB) 120, configured to wirelessly communicate with the UE 104. The wireless cellular network 112 may further include a mobility management entity (MME) 124 and a serving gateway (S-GW) 128.

In some embodiments, the WLAN 116 may be an Institute of Electrical and Electronics Engineers (IEEE) 802.11 (e.g., WiFi) WLAN network. The WLAN 116 may include a WLAN gateway 132. The WLAN gateway 132 may include, for example, a trusted wireless access gateway (TWAG) and/or an enhanced packet data gateway (ePDG). The UE 104 may communicate with the WLAN gateway 132 via an access point (AP, not shown). The UE 104 may wirelessly communicate with the AP.

In some embodiments, the network 100 may include one or more other components (not shown) between the UE 104 and the P-GW 108 to facilitate the wireless cellular network 112 and/or the WLAN 116. Additionally, in some embodiments, one or more of the components in the network 100 may be integrated into a single device.

The lines connecting the components of FIG. 1 may represent communicative coupling between the components in a control plane of the network 100 (e.g., a control plane of the wireless cellular network 112 or the WLAN 116). In the control plane of the wireless cellular network 112, the P-GW 108 may communicate with the S-GW 128 via a S5 and/or S8 interface, the S-GW 128 may communicate with the MME 124 via a S11 interface, the MME 124 may communicate with the eNB 120 via an S1 interface (e.g., an S1-MME interface), and/or the eNB 120 may communicate with the UE 104 via a radio resource control (RRC) interface. In the control plane of the WLAN 116, the P-GW 108 may communicate with the WLAN gateway 132 via a S2a and/or S2b interface, and/or the WLAN gateway 132 may communicate with the UE 104 via a Yy (e.g., WLAN control protocol (WLCP)) interface (e.g., via the AP).

In various embodiments, the UE 104 may establish one or more packet data network (PDN) connections with the P-GW 108. The one or more PDN connections may allow the UE 104 to obtain network services (e.g., to send and/or receive data signals). The PDN connections may be routed via the wireless cellular network 112 or the WLAN 116. Communication associated with the PDN connections may be made over a user plane (also referred to as the data plane) of the wireless cellular network 112 or the WLAN 116. PDN connections over the wireless cellular network 112 may be routed from the UE 104 to the P-GW 108 via the eNB 120, the MME 124, and the S-GW 128. PDN connections over the WLAN 116 may be routed from the UE 104 to the P-GW 108 via the WLAN gateway 132.

Figure 2:
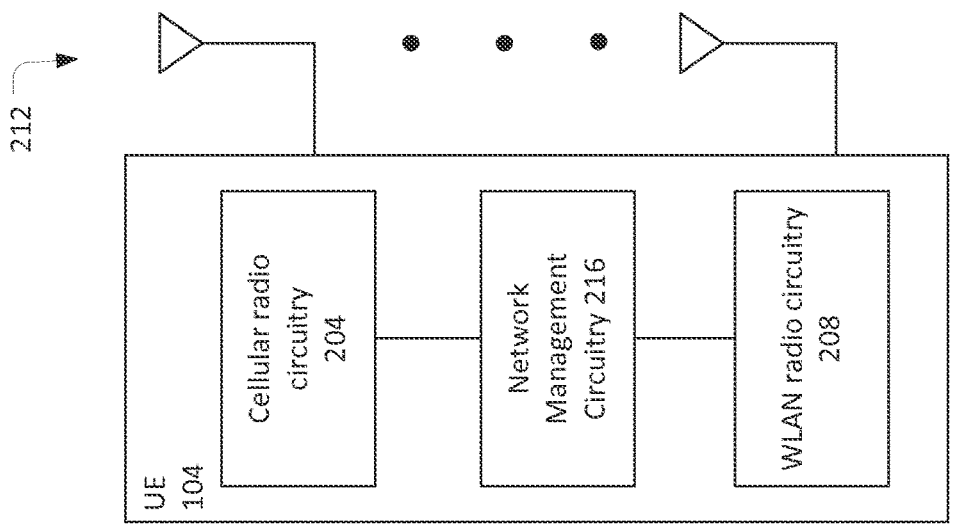
FIG. 2 is a block diagram illustrating a user equipment (UE) in accordance with various embodiments.

FIG. 2 schematically illustrates the UE 104 in accordance with various embodiments. The UE 104 may include cellular radio circuitry 204 to communicate with the eNB 120 over the wireless cellular network 112, and WLAN radio circuitry 208 to communicate with the AP 136 over the WLAN 116. The cellular radio circuitry 204 and/or WLAN radio circuitry 208 may be coupled to one or more antennas 212 of the UE 104 to transmit and/or receive signals. The UE 104 may further include network management circuitry 216 coupled to the cellular radio circuitry 204 and/or the WLAN radio circuitry 208.

Figure 3:
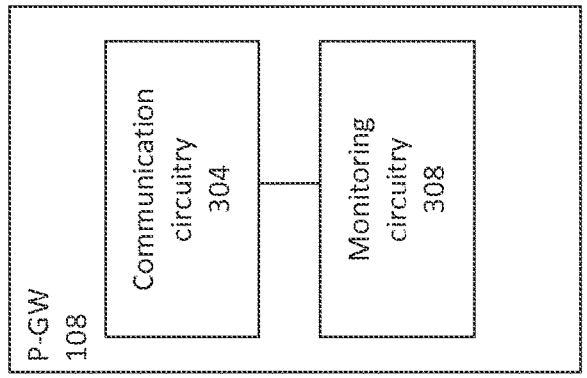
FIG. 3 is a block diagram illustrating a packet data network gateway (P-GW) in accordance with various embodiments.

FIG. 3 schematically illustrates the P-GW 108 in accordance with various embodiments. The P-GW 108 may include communication circuitry 304 to communicate with the UE 104 via the wireless cellular network 112 and/or the WLAN 116. The P-GW 108 may further include monitoring circuitry 308 coupled to the communication circuitry 304.

Figure 4:
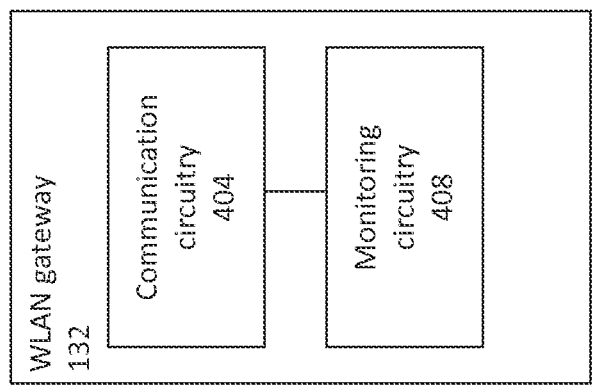
FIG. 4 is a block diagram illustrating a wireless local area network (WLAN) gateway in accordance with various embodiments.

FIG. 4 schematically illustrates the WLAN gateway 132 in accordance with various embodiments. The WLAN gateway 132 may include communication circuitry 404 to communicate with the UE 104 via the WLAN 116. The WLAN gateway 132 may further include monitoring circuitry 408 coupled to the communication circuitry 404.

Figure 5:
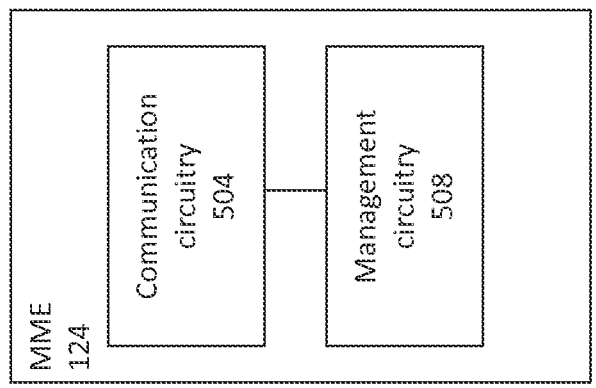
FIG. 5 is a block diagram illustrating a mobility management entity (MME) in accordance with various embodiments.

FIG. 5 illustrates the MME 124 in accordance with various embodiments. The MME 124 may include communication circuitry 504 to communicate with the eNB 120 and/or S-GW 128 via the wireless cellular network 112. The communication circuitry 504 may communicate with the eNB 120 and/or S-GW 128 via a wired and/or wireless interface. The MME 124 may further include management circuitry 508 coupled to the communication circuitry 504. The management circuitry 508 may manage communications of one or more eNBs, including eNB 120.

Figure 6:
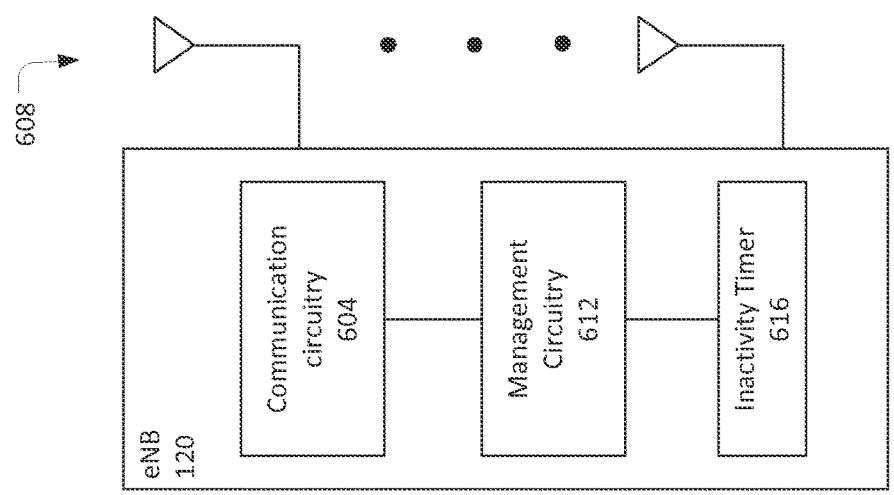
FIG. 6 is a block diagram illustrating an enhanced node base station (eNB) in accordance with various embodiments.

FIG. 6 schematically illustrates the eNB 120 in accordance with various embodiments. The eNB 120 may include communication circuitry 604 to communicate with the UE 104 via the wireless cellular network 112. The communication circuitry 604 may be coupled to one or more antennas 608 to send and/or receive signals. The eNB 120 may further include management circuitry 612 coupled to the communication circuitry 604. The management circuitry 612 may manage an inactivity timer 616 associated with the UE 104.

In various embodiments, the UE 104 may be in an RRC-Connected mode with the eNB 120 when one or more PDN connections are active on the wireless cellular network 112. When the UE 104 no longer has active PDN connections on the wireless cellular network 112, the management circuitry 612 of the eNB 120 may activate the inactivity timer 616. The inactivity timer 616 may expire after a pre-defined time period from a starting time of the inactivity timer. When the inactivity timer 616 expires, the management circuitry 612 may place the UE 104 in an RRC-Idle mode and/or a detached state.

In the RRC-Idle mode, the UE 104 may not have an RRC connection with the eNB 120, and may not be able to transmit or receive data packets in the user plane. No RRC context information for the UE 104 may be stored at the eNB 120. However, the UE 104 may be able to receive paging messages and/or other signaling (e.g., a system information broadcast) from the MME 124. In the detached state, the UE 104 may not be connected to any of the components of the wireless cellular network 112 (e.g., may not be able to receive messages from the eNB 120 or the MME 124). The management circuitry 612 may transmit an RRC connection release message to the UE 104 to place the UE 104 in the RRC-Idle mode. Additionally, or alternatively, the UE 104 may follow a PDN detach procedure to disconnect from the wireless cellular network 112 completely (e.g., to enter the detached state).

In various embodiments, one or more devices of the network 100 may initiate an inactivity timer reconfiguration (ITR) of the inactivity timer 616. For example, the ITR process may be initiated by the P-GW 108 (e.g., by the monitoring circuitry 308 of the P-GW 108), the WLAN gateway 132 (e.g., by the monitoring circuitry 408 of the WLAN gateway 132), the UE 104 (e.g., by the network management circuitry 216 of the UE 104), the MME 124 (e.g., the management circuitry 508 of the MME 124), and/or the eNB 120 (e.g., the management circuitry 612 of the eNB 120). The initiating device may monitor one or more PDN connections of the UE 104 that are communicated over the WLAN 116. The initiating device may determine that the UE should be in the RRC-Connected mode with the eNB 120 based on the monitored one or more PDN connections over the WLAN 116. The initiating device may further, based on the determination that the UE should be in the RRC-Connected mode, transmit an ITR message to request modification of one or more parameters of the inactivity timer 616. For example, the ITR message may request suspension of the inactivity timer 616. Alternatively, in some embodiments, the ITR message may request a change in the time period measured by the inactivity timer 616 (e.g., a length of time from a time the inactivity timer 616 is activated to a time that the inactivity timer 616 expires).

In various embodiments, the UE 104 may be maintained in the RRC-Connected mode while the inactivity timer 616 is suspended. Having the UE 104 in the RRC-Connected mode may allow the one or more PDN connections to be transferred from the WLAN 116 to the wireless cellular network 112 (e.g., by a handover process) more quickly than when the UE 104 is in the RRC-Idle mode or the disconnected state. Accordingly, suspension of the inactivity timer 616 may reduce latency for handover of the one or more PDN connections from the WLAN 116 to the wireless cellular network 112. A handover of the one or more PDN connections may be performed, for example, if the WLAN 116 fails and/or is unavailable (e.g., if the UE 104 moves out of a coverage area of the WLAN 116). The handover may be initiated, for example, by the UE 104, the P-GW 108, and/or the eNB 120.

As discussed above, in some embodiments, the ITR may be initiated by the P-GW 108. The monitoring circuitry 308 of the P-GW 108 may monitor one or more PDN connections of the UE that are communicated over the WLAN 116. The monitoring circuitry 308 may determine that the UE should be in the RRC-Connected mode with the eNB 120 based on the monitored one or more PDN connections. For example, the monitoring circuitry 308 may determine that the UE should be in the RRC-Connected mode based on a parameter of any one of the PDN connections, such as a desired quality of service (QoS) of the PDN connection (e.g., a QoS class indicator (QCI) associated with the first PDN connection), an application associated with the PDN connection, and/or another parameter.

The monitoring circuitry 308 may transmit, based on the determination that the UE 104 should be in the RRC-Connected mode, the ITR message to request suspension of the inactivity timer 616. In some embodiments, the UE 104 may have zero PDN connections via the wireless cellular network 112 at a time that the monitoring circuitry 308 determines that the UE 104 should be in the RRC-Connected mode and/or at a time that the monitoring circuitry 308 transmits the ITR message.

In some embodiments, the ITR message may include an ITR indicator (e.g., including one or more bits) having a first value to indicate that suspension of the inactivity timer 616 is requested. In some embodiments, the ITR message may further include a reason code (e.g., including one or more bits) to indicate a reason for suspending the inactivity timer. For example, the reason code may have a value to indicate that the reason for suspending the inactivity timer is a desired QoS of one or more of the active PDN connections on the WLAN 116.

In various embodiments, the management circuitry 612 of the eNB 120 may receive the ITR message, and may suspend the ITR timer 616 based on the ITR message. Accordingly, the UE 104 may be maintained in the RRC-Connected mode while the inactivity timer 616 is suspended.

In some embodiments, the management circuitry 612 of the eNB 120 may forward the ITR message to the UE 104. The network management circuitry 216 of the UE 104 may receive the ITR message and may prevent the UE 104 from initiating a detach procedure from the wireless cellular network 112 based on the ITR message. Accordingly, the UE 104 may not initiate the detach procedure while the inactivity timer 616 is suspended. Alternatively, or additionally, the UE 104 may be configured such that the UE 104 will not initiate the detach procedure when the UE 104 is connected to the P-GW 108 via the WLAN 116 and/or has an active PDN connection over the WLAN 116.

In various embodiments, after transmitting the ITR message, the monitoring circuitry 308 may determine that the UE 104 no longer needs to be in the RRC-Connected mode. For example, one or more PDN connections of the UE that triggered the ITR message may end. The monitoring circuitry 308 may transmit another ITR message to indicate that the inactivity timer 616 should be resumed. For example, the ITR indicator of the other ITR message may have a second value to indicate that the inactivity timer 616 should be resumed.

Figure 7:
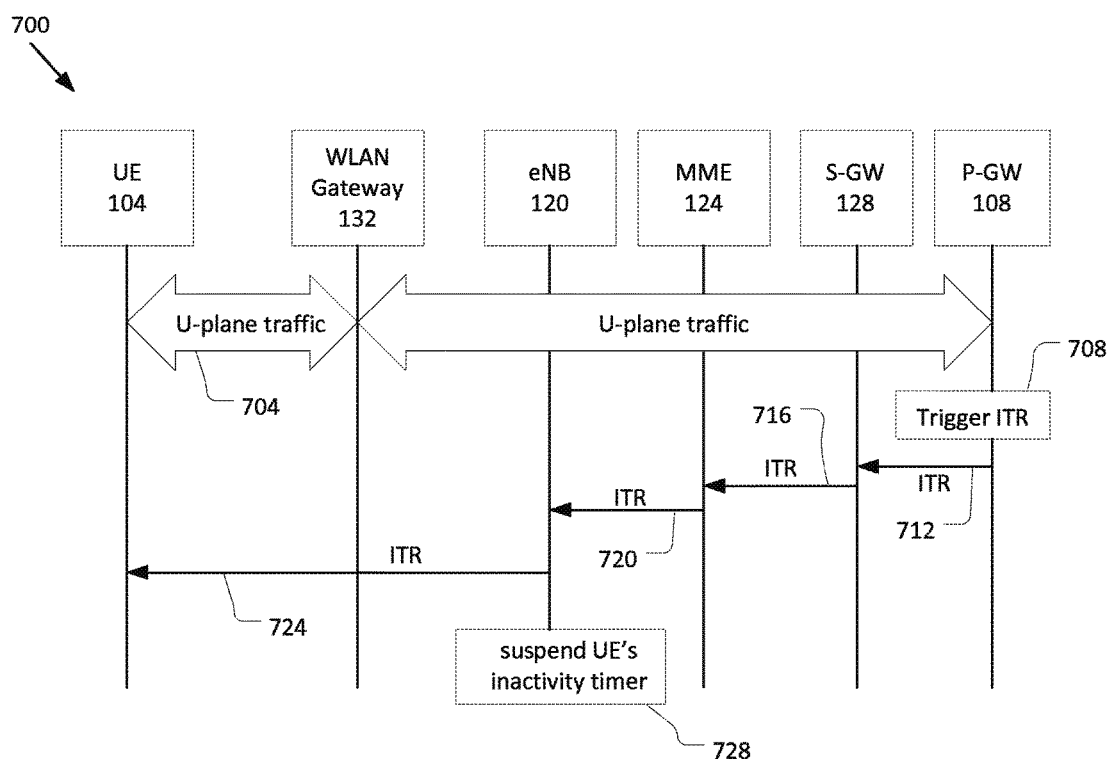
FIG. 7 illustrates an inactivity timer reconfiguration (ITR) process in which the ITR is initiated by the P-GW and in which the UE is in a radio resource control (RRC)-Connected mode when the ITR is initiated, in accordance with various embodiments.

In some embodiments, the monitoring circuitry 308 of the P-GW 108 may transmit the ITR message to the eNB 120 via the MME 124 and/or the S-GW 128. For example, FIG. 7 illustrates an ITR process 700 (also referred to as "process 700") in accordance with various embodiments. The process 700 may involve the UE 104, the P-GW 108, the eNB 120, the MME 124, the S-GW 128, and/or the WLAN gateway 132. In some embodiments, the UE 104 may be in the RRC-Connected mode when the ITR message is initiated in the ITR process 700.

The UE 104 may have user plane traffic 704 between the UE 104 and the P-GW 108 over the WLAN 116 via the WLAN gateway 132. The user plane traffic may include one or more PDN connections.

At 708 of the process 700, the P-GW 108 may trigger the ITR. For example, the P-GW may monitor the one or more PDN connections of the UE 104 over the WLAN 116, and may trigger the ITR based on the one or more PDN connections.

At 712 of the process 700, the P-GW 108 may transmit an ITR message to the S-GW 128. At 716, the S-GW 128 may forward the ITR message to the MME 124. At 720, the MME 124 may forward the ITR message to the eNB 120.

At 724, the eNB 120 may forward the ITR message to the UE 104 to instruct the UE 104 to not initiate a detach procedure from the wireless cellular network 112. Alternatively, or additionally, the UE 104 may be configured such that the UE 104 will not initiate the detach procedure when the UE 104 is connected to the P-GW 108 via the WLAN 116 and/or has an active PDN connection over the WLAN 116.

At 728, the eNB 120 may suspend the inactivity timer 616 associated with the UE 104. Accordingly, the eNB 120 may maintain the UE 104 in the RRC-Connected mode.

Alternatively, in some embodiments, the P-GW 108 may transmit the ITR message to the WLAN 116 (e.g., to the WLAN gateway 132). In these embodiments, the ITR process may be similar to the ITR process 1000 shown in FIG. 10 and discussed below.

In some cases, the eNB 120 may decide to keep the inactivity timer 616 active even after receiving the ITR message. Accordingly, the eNB 120 may transition the UE 104 to the RRC-Idle mode after the inactivity timer 616 expires. In some embodiments, after the UE 104 enters the RRC-Idle mode, the MME 124 may page the UE 104 to request that the UE 104 transition back to the RRC-Connected mode. The MME 124 may then re-transmit the ITR message to the eNB 120 to request that the inactivity timer

616 be suspended. For example, the MME 124 may wait for a pre-defined period of time (e.g., for the expiration of an ITR retry timer) after the UE 104 enters the RRC-Idle mode to page the UE 104 and re-transmit the ITR message.

In some cases, the UE 104 may not be in the RRC-Connected mode when the MME 124 receives the ITR message. Accordingly, in some embodiments, the management circuitry 508 of the MME 124 may process the ITR message received from the P-GW 108, and identify that the UE 104 is in the RRC-Idle mode with the eNB 120. The management circuitry 508 may page the UE 104, responsive to the identification, to instruct the UE 104 to enter the RRC-Connected mode with the eNB. The management circuitry 508 may further transmit the ITR message to the eNB 120. In some embodiments, the management circuitry 508 may transmit the ITR message to the eNB 120 after the UE 104 has entered the RRC-Connected mode with the eNB 120 (e.g., responsive to receiving the page from the MME 124).

Figure 8:
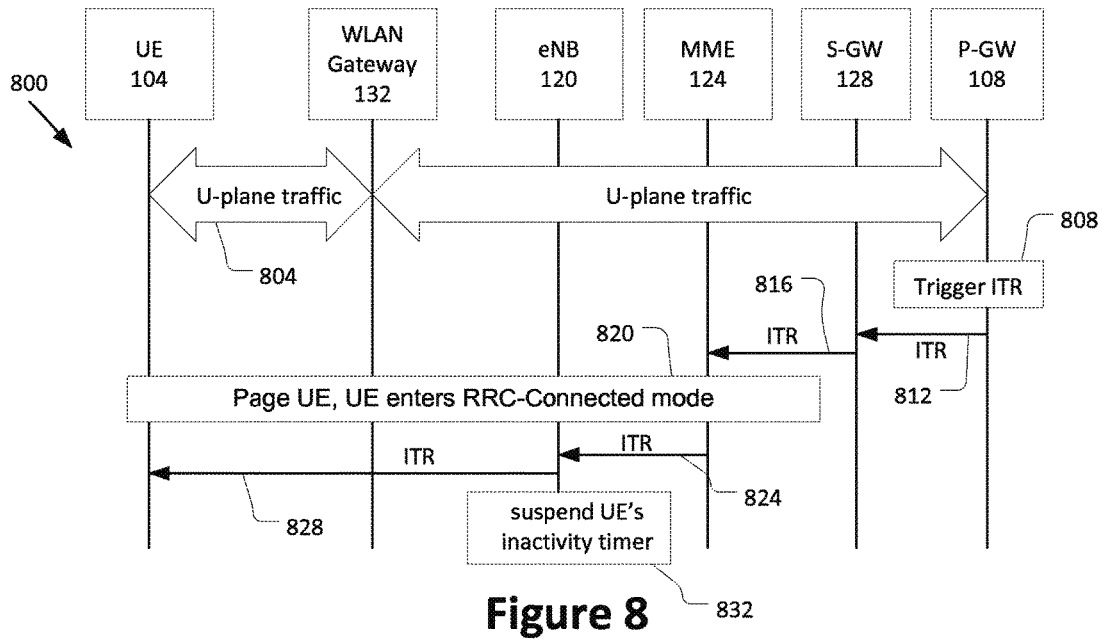
FIG. 8 illustrates an ITR process in which the ITR is initiated by the P-GW and in which the UE is in an RRC-Idle mode when the ITR is initiated, in accordance with various embodiments.

For example, FIG. 8 illustrates an ITR process 800 (also referred to as "process 800") in which the ITR message is initiated by the P-GW 108, and the UE 104 is in the RRC-Idle mode. The process 800 may involve the UE 104, the P-GW 108, the eNB 120, the MME 124, the S-GW 128, and/or the WLAN gateway 132.

The UE 104 may have user plane traffic 804 between the UE 104 and the P-GW 108 over the WLAN 116 via the WLAN gateway 132. The user plane traffic 804 may include one or more PDN connections.

At 808 of the process 800, the P-GW 108 may trigger the ITR. For example, the P-GW may monitor the one or more PDN connections of the UE 104 over the WLAN 116, and may trigger the ITR based on the one or more PDN connections (e.g., based on a parameter, such as desired QoS, of one or more of the PDN connections).

At 812 of the process 700, the P-GW 108 may transmit an ITR message to the S-GW 128. At 816, the S-GW 128 may forward the ITR message to the MME 124.

At 820, the MME 124 may page the UE 104 to instruct the UE 104 to enter the RRC-Connected mode with the eNB 120. The UE 104 may receive the page and enter the RRC-Connected mode with the eNB 120. The MME 124 may further establish the S1 interface between the MME 124 and the eNB 120, if needed.

At 824, the MME 124 may send the ITR message to the eNB 120.

At 828, the eNB 120 may forward the ITR message to the UE 104 to instruct the UE 104 not to initiate a detach procedure from the wireless cellular network 112. Additionally, at 832, the eNB 120 may suspend the inactivity timer 616 associated with the UE 104.

In other cases, the UE 104 may be detached from the wireless cellular network 112 when the P-GW 108 triggers the ITR. In that case, the P-GW 108 may identify that the UE 104 is detached from the wireless cellular network 112, and may transmit a connection request to the UE 104 via the WLAN 116 (e.g., via the WLAN gateway 132) to instruct the UE 104 to connect to the wireless cellular network 112 and enter the RRC-Connected mode.

Figure 9:
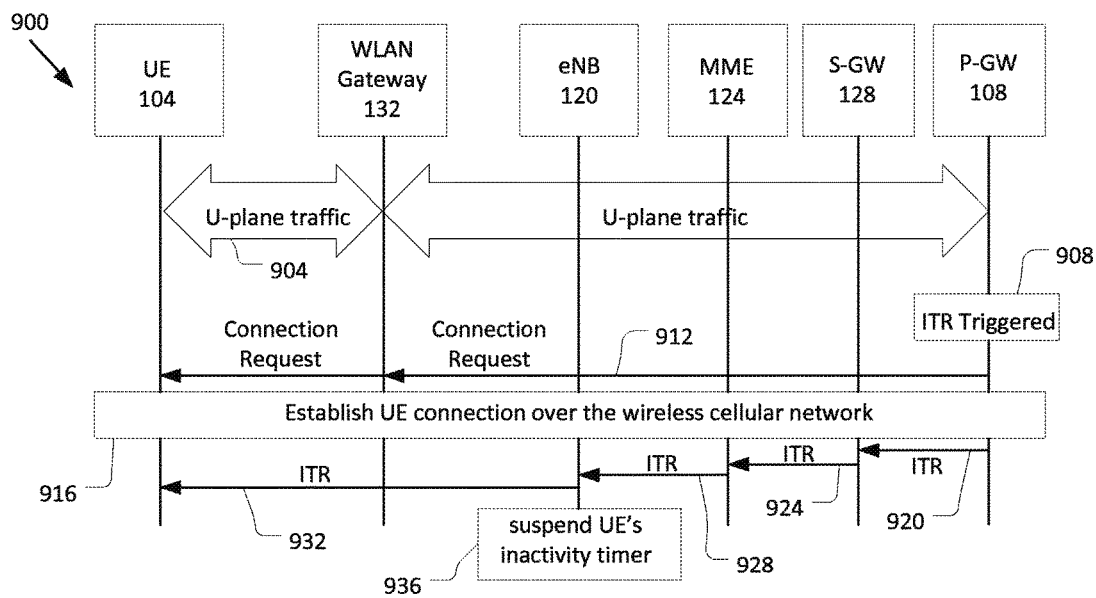
FIG. 9 illustrates an ITR process in which the ITR is initiated by the P-GW and in which the UE is in a detached state when the ITR is initiated, in accordance with various embodiments.

For example, FIG. 9 illustrates an ITR process 900 (also referred to as "process 900") that may be performed when the UE 104 is in the detached state when the ITR is triggered. The process 900 may involve the UE 104, the P-GW 108, the eNB 120, the MME 124, the S-GW 128, and/or the WLAN gateway 132.

The UE 104 may have user plane traffic 904 between the UE 104 and the P-GW 108 over the WLAN 116 via the WLAN gateway 132. The user plane traffic 904 may include one or more PDN connections.

At 908 of the process 900, the P-GW 108 may trigger the ITR. For example, the P-GW may monitor the one or more PDN connections of the UE 104 over the WLAN 116, and may trigger the ITR based on the one or more PDN connections (e.g., based on a parameter, such as desired QoS, of one or more of the PDN connections).

At 912, the P-GW 108 may transmit a connection request to the UE 104 via the WLAN 116 (e.g., via the WLAN gateway 132) to instruct the UE 104 to connect to the wireless cellular network 112 and enter the RRC-Connected mode with the eNB 120. The connection request may be transmitted responsive to a determination (e.g., by the P-GW 108) that the UE 104 is detached from the wireless cellular network 112. In some embodiments, the connection request may include a connection identifier, such as an access point name (APN) for the UE 104 to use to establish the connection with the wireless cellular network 112.

At 916, the UE 104 may establish a connection over the wireless cellular network 112 and enter the RRC-Connected mode with the eNB 120. In some embodiments, the UE 104 may establish the connection with the wireless cellular network 112 based on the connection identifier.

At 920, The P-GW 108 may transmit the ITR message to the S-GW 128. At 924, the S-GW 128 may forward the ITR message to the MME 124. At 928, the MME 124 may forward the ITR message to the eNB 120.

At 932, the eNB 120 may forward the ITR message to the UE 104 to instruct the UE 104 not to initiate a detach procedure from the wireless cellular network 112. Additionally, at 936, the eNB 120 may suspend the inactivity timer 616 associated with the UE 104.

As discussed above, in some embodiments, the P-GW 108 may transmit a second ITR message to indicate that the inactivity timer 616 should be resumed. The P-GW 108 may transmit the second ITR message to the eNB 120 via the S-GW 128 and/or the MME 124. In some embodiments, if the UE 104 is in the RRC-Idle mode or the detached state when the MME 124 receives the second ITR message, the MME 124 may discard the second ITR message without sending the second ITR message to the eNB 120.

As discussed above, in some embodiments, the ITR message may be transmitted by the WLAN 116 (e.g., the WLAN gateway 132). For example, the WLAN gateway 132 may transmit the ITR message to the UE 104, and the UE 104 may forward the ITR message to the eNB 120. The transmission of the ITR message may be initiated by a WLAN entity, such as the WLAN gateway 132. Alternatively, the P-GW 108 may trigger the transmission of the ITR message and may send the ITR message to the WLAN gateway 132 for forwarding to the UE 104 and/or the eNB 120.

Figure 10:
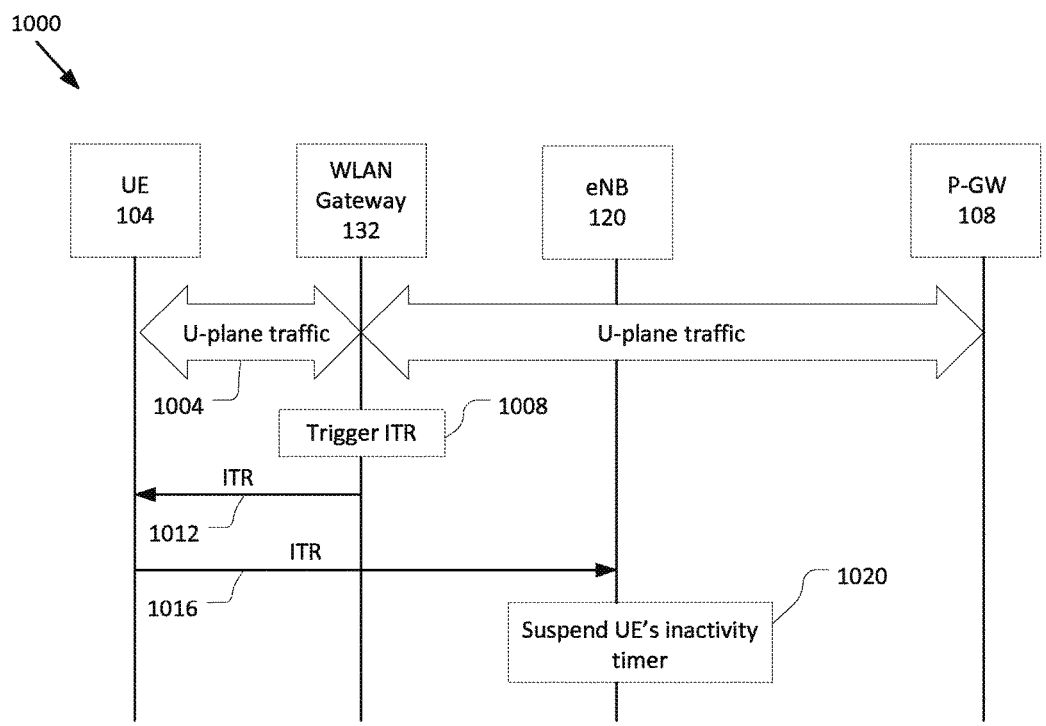
FIG. 10 illustrates an ITR process in which the ITR is initiated by the WLAN gateway, in accordance with various embodiments.

FIG. 10 illustrates an ITR process 1000 (also referred to as "process 1000") in which the ITR message is transmitted by the WLAN gateway 132, in accordance with various embodiments. The process 1000 may involve the UE 104, the WLAN gateway 132, the P-GW 108, and/or the eNB 120.

The UE 104 may have user plane traffic 1004 between the UE 104 and the P-GW 108 over the WLAN 116 via the WLAN gateway 132. The user plane traffic 1004 may include one or more PDN connections.

At 1008 of the process 1000, the WLAN gateway 132 may trigger the ITR. For example, the WLAN gateway 132 may monitor the one or more PDN connections of the UE 104 over the WLAN 116, and may trigger the ITR based on the one or more PDN connections (e.g., based on a parameter, such as desired QoS, of one or more of the PDN connections). Alternatively, or additionally, the WLAN gateway 132 may trigger the ITR based on a request from the P-GW 108.

At 1012 of the process 1000, the WLAN gateway 132 may transmit the ITR message to the UE 104. At 1016 of the process 1000, the UE 104 may forward the ITR message to the eNB 120. At 1020, the eNB 120 may suspend the inactivity timer 616 associated with the UE 104.

In some cases, the eNB 120 may decide to keep the inactivity timer 616 active even after receiving the ITR message. Accordingly, the eNB 120 may transition the UE 104 to the RRC-Idle mode after the inactivity timer 616 expires. In some embodiments, after the UE 104 enters the RRC-Idle mode, the UE 104 may re-connect to the eNB 120 to re-enter the RRC-Connected mode, and then re-transmit the ITR message to the eNB 120 to request that the inactivity timer 616 be suspended. For example, the UE 104 may wait for a pre-defined period of time (e.g., for the expiration of an ITR retry timer) after the UE 104 enters the RRC-Idle mode to re-connect to the eNB 120 and re-transmit the ITR message.

In various embodiments, the connection of the UE 104 over the wireless cellular network 112 may be transferred from the eNB 120 (e.g., the serving eNB) to another eNB (e.g., the target eNB) via a handover process. The receiving eNB may be notified of the status of the inactivity timer 616 associated with the UE 104 as part of the handover process. The status may indicate whether or not the inactivity timer 616 is suspended.

For example, the eNB 120 may provide the status of the inactivity timer 616 to the target eNB as part of the handover request and/or as part of the SN status transfer operation associated with the handover. Alternatively, the UE 104 may send the status of the inactivity timer 616 to the target eNB, for example during or after RRC reconfiguration with the target eNB.

In some embodiments, the wireless cellular network 112 may control traffic steering across the WLAN 116 and the wireless cellular network 112. Accordingly, the wireless cellular network 112 (e.g., the MME 124 and/or the eNB 120) may determine whether to migrate PDN connections to the WLAN 116. In some embodiments, the wireless cellular network 112 may suspend the inactivity timer 116 when all traffic is moved to the WLAN 116.

In some embodiments, the eNB 120 may communicate with the WLAN 116 (e.g., the WLAN gateway 132) via a communication interface to receive information associated with PDN connections of the UE 104 that are over the WLAN 116. The communication interface may allow the eNB 120 to monitor the PDN connections of the UE 104 over the WLAN 116, and initiate ITR as described herein.

Figure 11:
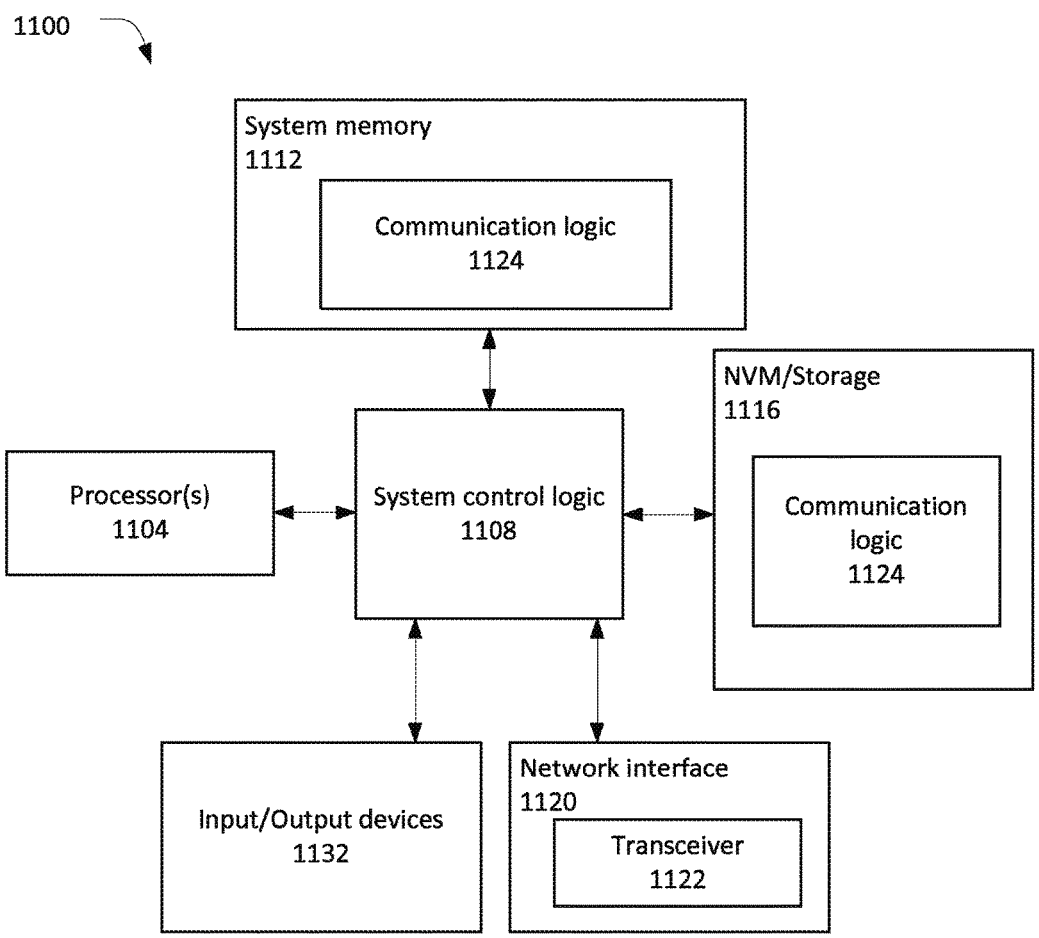
FIG. 11 illustrates an example system configured to employ the apparatuses and methods described herein, in accordance with various embodiments.

The UE 104, P-GW 108, eNB 120, MME 124, S-GW 128, and/or WLAN gateway 132 described herein may be implemented into a system using any suitable hardware and/or software to configure as desired. FIG. 11 illustrates, for one embodiment, an example system 1100 comprising one or more processor(s) 1104, system control logic 1108 coupled with at least one of the processor(s) 1104, system memory 1112 coupled with system control logic 1108, non-volatile memory (NVM)/storage 1116 coupled with system control logic 1108, a network interface 1120 coupled with system control logic 1108, and input/output (I/O) devices 1132 coupled with system control logic 1108.

The processor(s) 1104 may include one or more single-core or multi-core processors. The processor(s) 1104 may include any combination of general-purpose processors and dedicated processors (e.g., graphics processors, application processors, baseband processors, etc.).

System control logic 1108 for one embodiment may include any suitable interface controllers to provide for any suitable interface to at least one of the processor(s) 1104 and/or to any suitable device or component in communication with system control logic 1108.

System control logic 1108 for one embodiment may include one or more memory controller(s) to provide an interface to system memory 1112. System memory 1112 may be used to load and store data and/or instructions, e.g., communication logic 1124. System memory 1112 for one embodiment may include any suitable volatile memory, such as suitable dynamic random access memory (DRAM), for example.

NVM/storage 1116 may include one or more tangible, non-transitory computer-readable media used to store data and/or instructions, e.g., communication logic 1124. NVM/storage 1116 may include any suitable non-volatile memory, such as flash memory, for example, and/or may include any suitable non-volatile storage device(s), such as one or more hard disk drive(s) (HDD(s)), one or more compact disk (CD) drive(s), and/or one or more digital versatile disk (DVD) drive(s), for example.

The NVM/storage 1116 may include a storage resource physically part of a device on which the system 1100 is installed or it may be accessible by, but not necessarily a part of, the device. For example, the NVM/storage 1116 may be accessed over a network via the network interface 1120 and/or over Input/Output (I/O) devices 1132.

The communication logic 1124 may include instructions that, when executed by one or more of the processors 1104, cause the system 1100 to perform operations associated with the components of the UE 104, P-GW 108, eNB 120, MME 124, S-GW 128, WLAN gateway 132, and/or the processes 700, 800, 900, or 1000 as described with respect to the above embodiments. In various embodiments, the communication logic 1124 may include hardware, software, and/or firmware components that may or may not be explicitly shown in system 1100.

Network interface 1120 may have a transceiver 1122 to provide a radio interface for system 1100 to communicate over one or more network(s) and/or with any other suitable device. In various embodiments, the transceiver 1122 may be integrated with other components of system 1100. For example, the transceiver 1122 may include a processor of the processor(s) 1104, memory of the system memory 1112, and NVM/Storage of NVM/Storage 1116. Network interface 1120 may include any suitable hardware and/or firmware. Network interface 1120 may include a plurality of antennas to provide a multiple input, multiple output radio interface. Network interface 1120 for one embodiment may include, for example, a wired network adapter, a wireless network adapter, a telephone modem, and/or a wireless modem.

For one embodiment, at least one of the processor(s) 1104 may be packaged together with logic for one or more controller(s) of system control logic 1108. For one embodiment, at least one of the processor(s) 1104 may be packaged together with logic for one or more controllers of system control logic 1108 to form a System in Package (SiP). For one embodiment, at least one of the processor(s) 1104 may be integrated on the same die with logic for one or more controller(s) of system control logic 1108. For one embodiment, at least one of the processor(s) 1104 may be integrated on the same die with logic for one or more controller(s) of system control logic 1108 to form a System on Chip (SoC).

In various embodiments, the I/O devices 1132 may include user interfaces designed to enable user interaction with the system 1100, peripheral component interfaces designed to enable peripheral component interaction with the system 1100, and/or sensors designed to determine environmental conditions and/or location information related to the system 1100.

In various embodiments, the user interfaces could include, but are not limited to, a display (e.g., a liquid crystal display, a touch screen display, etc.), speakers, a microphone, one or more cameras (e.g., a still camera and/or a video camera), a flashlight (e.g., a light emitting diode flash), and a keyboard.

In various embodiments, the peripheral component interfaces may include, but are not limited to, a non-volatile memory port, a universal serial bus (USB) port, an audio jack, an Ethernet connection, and a power supply interface.

In various embodiments, the sensors may include, but are not limited to, a gyro sensor, an accelerometer, a proximity sensor, an ambient light sensor, and a positioning unit. The positioning unit may also be part of, or interact with, the network interface 1120 to communicate with components of a positioning network, e.g., a global positioning system (GPS) satellite.

In various embodiments, the system 1100 may be a mobile computing device such as, but not limited to, a laptop computing device, a tablet computing device, a netbook, a smartphone, etc. In various embodiments, system 1100 may have more or less components, and/or different architectures.

Some non-limiting Examples are provided below.

Example 1 is an apparatus for inactivity timer reconfiguration, the apparatus comprising: communication circuitry to communicate with a user equipment (UE) via a wireless local area network (WLAN); and monitoring circuitry coupled to the communication circuitry. The monitoring circuitry is to: monitor one or more packet data network (PDN) connections of the UE that are over the WLAN; determine that the UE should be in a radio resource control (RRC)-Connected mode with an evolved node base station (eNB) of a wireless cellular network based on the monitored one or more PDN connections; and transmit, based on the determination that the UE should be in the RRC-Connected mode, an inactivity timer reconfiguration (ITR) message to request suspension of an inactivity timer associated with the UE.

Example 2 is the apparatus of Example 1, wherein the UE has zero PDN connections via the wireless cellular network at a time that the monitoring circuitry determines that the UE should be in the RRC-Connected mode with the eNB.

Example 3 is the apparatus of Example 1, wherein the monitoring circuitry is to determine that the UE should be in the RRC-Connected mode with the eNB based on a desired quality of service (QoS) associated with a first PDN connection of the one or more PDN connections.

Example 4 is the apparatus of Example 1, wherein the apparatus is to be employed by a PDN gateway (P-GW) that is to communicate with the UE via the WLAN and via the wireless cellular network.

Example 5 is the apparatus of Example 1, wherein the monitoring circuitry is to transmit the ITR message to a mobility management entity (MME) of the wireless cellular network, wherein the MME is to forward the ITR message to the eNB.

Example 6 is the apparatus of Example 5, wherein, if the UE is in an RRC-Idle mode with the eNB, the MME is to page the UE to instruct the UE to enter the RRC-Connected mode with the eNB.

Example 7 is the apparatus of Example 1, wherein the monitoring circuitry is to, if the UE is detached from the eNB, transmit a PDN connection request message to the UE via the WLAN to instruct the UE to enter the RRC-Connected mode with the eNB.

Example 8 is the apparatus of Example 1, wherein the monitoring circuitry is to transmit the ITR message to the UE via the WLAN.

Example 9 is the apparatus of Example 1, wherein the apparatus is to be employed by a trusted wireless access gateway (TWAG) or an enhanced packet data gateway (ePDG) of the WLAN.

Example 10 is the apparatus of any one of Examples 1 to 9, wherein the ITR message is a first ITR message that includes an indicator having a first value to indicate that suspension of the inactivity timer associated with the UE is requested, and wherein the monitoring circuitry is further to transmit a second ITR message that includes an indicator having a second value to indicate that the inactivity timer should be resumed.

Example 11 is the apparatus of any one of Examples 1 to 9, wherein the ITR message includes a reason code to indicate a reason for suspending the inactivity timer.

Example 12 is a method to be employed by an evolved node base station (eNB), the method comprising: communicating with a user equipment (UE) in a radio resource control (RRC)-Connected mode via a wireless cellular network; receiving an inactivity timer reconfiguration (ITR) message to indicate that suspension of an inactivity timer associated with the UE is requested; and suspending the inactivity timer responsive to the ITR message.

Example 13 is the method of Example 12, wherein the ITR message is a first ITR message that includes an indicator having a first value to indicate that suspension of the inactivity timer associated with the UE is requested, and wherein the method further comprises: receiving a second ITR message that includes an indicator having a second value to indicate that the inactivity timer should be resumed; and activating the inactivity timer responsive to the second ITR message.

Example 14 is the method of Example 12, wherein the ITR message includes a reason code to indicate a reason for suspending the inactivity timer.

Example 15 is the method of Example 12, further comprising maintaining the UE in the RRC-Connected mode while the inactivity timer is suspended.

Example 16 is the method of any one of Examples 12 to 15, further comprising transmitting a status of the inactivity timer to another eNB as part of a handover process for the UE.

Example 17 is the method of any one of Examples 12 to 15, further comprising forwarding the ITR message to the UE to instruct the UE to not initiate a detach procedure with the eNB while the inactivity timer is suspended unless a radio link on the wireless cellular network fails.

Example 18 is an apparatus to be employed by a user equipment (UE), the apparatus comprising: cellular radio circuitry to communicate with an evolved node base station (eNB) over a wireless cellular network; wireless local area network (WLAN) radio circuitry to communicate over a WLAN; and network management circuitry coupled to the cellular radio circuitry and the WLAN radio circuitry. The network management circuitry is to: receive an inactivity timer reconfiguration (ITR) message to request that an inactivity timer be suspended, wherein the inactivity timer is associated with the UE and managed by the eNB; and if the UE is in a radio resource control (RRC)-connected mode with the eNB, transmit the ITR message to the eNB.

Example 19 is the apparatus of Example 18, wherein the network management circuitry is further to: if the UE is in an RRC-Idle mode with the eNB or is detached from the wireless cellular network, establish a connection with the eNB in the RRC-connected mode and then transmit the ITR message to the eNB.

Example 20 is the apparatus of Example 18, wherein the network management circuitry is further to: determine that the eNB has kept the inactivity timer active after receiving the ITR message; transmit, responsive to the determination that the eNB has kept the inactivity timer active, another ITR message to the eNB after a pre-determined time period.

Example 21 is the apparatus of any one of Examples 18 to 20, wherein the network management circuitry is further to prevent, based on the ITR message, the UE from initiating a detach process from the wireless cellular network.

Example 22 is the apparatus of any one of Examples 18 to 20, wherein the WLAN radio circuitry is connected to a packet data network gateway (P-GW) via the WLAN, and wherein the network management circuitry is further to prevent the UE from initiating a detach process from the wireless cellular network while the WLAN radio circuitry is connected to the P-GW via the WLAN.

Example 23 is one or more tangible computer-readable media having instructions, stored thereon, that when executed cause a mobility management entity (MME) to: process an inactivity timer reconfiguration (ITR) message received from a packet data network gateway (P-GW) to indicate that an inactivity timer associated with a user equipment (UE) is to be suspended; identify that the UE is in a radio resource control (RRC)-Idle mode with an evolved node base station (eNB) managed by the MME; page the UE, responsive to the identification, to instruct the UE to enter the RRC-connected mode with the eNB; and transmit the ITR message to the eNB.

Example 24 is the one or more computer-readable media of Example 23, wherein the ITR message is a first ITR message, and wherein the instructions, when executed, further cause the MME to: receive a second ITR message to indicate that the inactivity timer associated with the UE is to be suspended; identify that the UE is in the RRC-Connected mode with the eNB at a time of receipt of the second ITR message; and transmit the ITR message to the eNB based on the identification that the UE is in the RRC-Connected mode.

Example 25 is the one or more computer-readable media of Example 23, wherein the instructions, when executed, further cause the MME to: determine that the eNB has kept the inactivity timer active after receiving the ITR message; transmit, responsive to the determination that the eNB has kept the inactivity timer active, another ITR message to the eNB after a pre-determined time period.

Example 26 is an apparatus to be employed by a mobility management entity (MME), the apparatus comprising: means to process an inactivity timer reconfiguration (ITR) message received from a packet data network gateway (P-GW) to indicate that an inactivity timer associated with a user equipment (UE) is to be suspended; means to identify that the UE is in a radio resource control (RRC)-Idle mode with an evolved node base station (eNB) managed by the MME; means to page the UE, responsive to the identification, to instruct the UE to enter the RRC-connected mode with the eNB; and means to transmit the ITR message to the eNB.

Example 27 is the apparatus of Example 26, wherein the ITR message is a first ITR message, and wherein the apparatus further comprises: means to receive a second ITR message to indicate that the inactivity timer associated with the UE is to be suspended; means to identify that the UE is in the RRC-Connected mode with the eNB at a time of receipt of the second ITR message; and means to transmit the second ITR message to the eNB based on the identification that the UE is in the RRC-Connected mode.

Example 28 is the apparatus of Example 26, further comprising: means to determine that the eNB has kept the inactivity timer active after receiving the ITR message; and means to transmit, responsive to the determination that the eNB has kept the inactivity timer active, another ITR message to the eNB after a pre-determined time period.

Although certain embodiments have been illustrated and described herein for purposes of description, this application is intended to cover any adaptations or variations of the embodiments discussed herein. Therefore, it is manifestly intended that embodiments described herein be limited only by the claims.

Where the disclosure recites "a" or "a first" element or the equivalent thereof, such disclosure includes one or more such elements, neither requiring nor excluding two or more such elements. Further, ordinal indicators (e.g., first, second, or third) for identified elements are used to distinguish between the elements, and do not indicate or imply a required or limited number of such elements, nor do they indicate a particular position or order of such elements unless otherwise specifically stated.

What is claimed is:

1. An apparatus comprising:
   communication circuitry to communicate with a user equipment (UE) via a wireless local area network (WLAN); and
   monitoring circuitry coupled to the communication circuitry, the monitoring circuitry to:
     monitor one or more packet data network (PDN) connections of the UE that are over the WLAN;
     determine that the UE should be in a radio resource control (RRC)-Connected mode with an evolved node base station (eNB) of a wireless cellular network based on the monitored one or more PDN connections; and
     transmit, based on the determination that the UE should be in the RRC-Connected mode, an inactivity timer reconfiguration (ITR) message to request suspension of an inactivity timer associated with the UE to maintain the UE in the RRC-Connected mode with the eNB;
   wherein the ITR message includes a reason code to indicate a reason for suspending the inactivity timer.

2. The apparatus of claim 1, wherein the UE has zero PDN connections via the wireless cellular network at a time that the monitoring circuitry determines that the UE should be in the RRC-Connected mode with the eNB.

3. The apparatus of claim 1, wherein the monitoring circuitry is to determine that the UE should be in the RRC-Connected mode with the eNB based on a desired quality of service (QoS) associated with a first PDN connection of the one or more PDN connections.

4. The apparatus of claim 1, wherein the apparatus is to be employed by a PDN gateway (P-GW) that is to communicate with the UE via the WLAN and via the wireless cellular network.

5. The apparatus of claim 1, wherein the monitoring circuitry is to transmit the ITR message to a mobility management entity (MME) of the wireless cellular network, wherein the MME is to forward the ITR message to the eNB.

6. The apparatus of claim 5, wherein, if the UE is in an RRC-Idle mode with the eNB, the MME is to page the UE to instruct the UE to enter the RRC-Connected mode with the eNB.

7. The apparatus of claim 1, wherein the monitoring circuitry is to, if the UE is detached from the eNB, transmit a PDN connection request message to the UE via the WLAN to instruct the UE to enter the RRC-Connected mode with the eNB.

8. The apparatus of claim 1, wherein the monitoring circuitry is to transmit the ITR message to the UE via the WLAN.

9. The apparatus of claim 1, wherein the apparatus is to be employed by a trusted wireless access gateway (TWAG) or an enhanced packet data gateway (ePDG) of the WLAN.

10. The apparatus of claim 1, wherein the ITR message is a first ITR message that includes an indicator having a first value to indicate that suspension of the inactivity timer associated with the UE is requested, and wherein the monitoring circuitry is further to transmit a second ITR message that includes an indicator having a second value to indicate that the inactivity timer should be resumed.

11. An apparatus to be employed by an evolved node base station (eNB), the apparatus comprising:
an inactivity timer associated with a user equipment (UE) being in a radio resource control (RRC)-Connected mode with the eNB of a wireless cellular network; and
management circuitry coupled to the inactivity timer, the management circuitry to:
receive an inactivity timer reconfiguration (ITR) message to indicate that suspension of the inactivity timer associated with the UE is requested, wherein the ITR message is to include a reason code to indicate a reason for suspending the inactivity timer; and
suspend the inactivity timer responsive to the ITR message to maintain the UE in the RRC-Connected mode.

12. The apparatus of claim 11, wherein the management circuitry is to maintain the UE in the RRC-Connected mode while the inactivity timer is suspended.

13. An apparatus to be employed by an evolved node base station (eNB), the apparatus comprising:
an inactivity timer associated with a user equipment (UE) being in a radio resource control (RRC)-Connected mode with the eNB of a wireless cellular network; and
management circuitry coupled to the inactivity timer, the management circuitry to:
receive a first inactivity timer reconfiguration (ITR) message having a first value to indicate that suspension of the inactivity timer associated with the UE is requested;
suspend the inactivity timer responsive to the ITR message to maintain the UE in the RRC-Connected mode;
receive a second ITR message that includes an indicator having a second value to indicate that the inactivity timer should be resumed; and
activate the inactivity timer responsive to the second ITR message.

14. An apparatus to be employed by an evolved node base station (eNB), the apparatus comprising:
an inactivity timer associated with a user equipment (UE) being in a radio resource control (RRC)-Connected mode with the eNB of a wireless cellular network; and
management circuitry coupled to the inactivity timer, the management circuitry to:
receive an inactivity timer reconfiguration (ITR) message to indicate that suspension of the inactivity timer associated with the UE is requested;
suspend the inactivity timer responsive to the ITR message to maintain the UE in the RRC-Connected mode; and
transmit a status of the inactivity timer to another eNB as part of a handover process for the UE.

15. An apparatus to be employed by an evolved node base station (eNB), the apparatus comprising:
an inactivity timer associated with a user equipment (UE) being in a radio resource control (RRC)-Connected mode with the eNB of a wireless cellular network; and
management circuitry coupled to the inactivity timer, the management circuitry to:
receive an inactivity timer reconfiguration (ITR) message to indicate that suspension of the inactivity timer associated with the UE is requested;
suspend the inactivity timer responsive to the ITR message to maintain the UE in the RRC-Connected mode; and
forward the ITR message to the UE to instruct the UE to not initiate a detach procedure with the eNB while the inactivity timer is suspended unless a radio link on the wireless cellular network fails.

16. An apparatus to be employed by a user equipment (UE), the apparatus comprising:
cellular radio circuitry to communicate with an evolved node base station (eNB) over a wireless cellular network;
wireless local area network (WLAN) radio circuitry to communicate over a WLAN; and
network management circuitry coupled to the cellular radio circuitry and the WLAN radio circuitry, the network management circuitry to:
receive, via the wireless cellular network or the WLAN, an inactivity timer reconfiguration (ITR) message to request that an inactivity timer be suspended, wherein the inactivity timer is associated with the UE and managed by the eNB; and
if the UE is in a radio resource control (RRC)-Connected mode with the eNB, transmit the ITR message to the eNB.

17. The apparatus of claim 16, wherein the network management circuitry is further to:
if the UE is in an RRC-Idle mode with the eNB or is detached from the wireless cellular network, establish a connection with the eNB in the RRC-Connected mode and then transmit the ITR message to the eNB.

18. The apparatus of claim 16, wherein the network management circuitry is further to:
determine that the eNB has kept the inactivity timer active after receiving the ITR message;
transmit, responsive to the determination that the eNB has kept the inactivity timer active, another ITR message to the eNB after a pre-determined time period.

19. The apparatus of claim 16, wherein the network management circuitry is further to prevent, based on the ITR message, the UE from initiating a detach process from the wireless cellular network.

20. The apparatus of claim 16, wherein the WLAN radio circuitry is connected to a packet data network gateway (P-GW) via the WLAN, and wherein the network management circuitry is further to prevent the UE from initiating a detach process from the wireless cellular network while the WLAN radio circuitry is connected to the P-GW via the WLAN.

21. One or more non-transitory computer-readable media having instructions, stored thereon, that when executed cause a mobility management entity (MME) to:
  process an inactivity timer reconfiguration (ITR) message received from a packet data network gateway (P-GW) to indicate that an inactivity timer associated with a user equipment (UE) is to be suspended;
  identify that the UE is in a radio resource control (RRC)-Idle mode with an evolved node base station (eNB) managed by the MME;
  page the UE, responsive to the identification that the UE is in the RRC-Idle mode and the processing of the ITR message, to instruct the UE to enter a RRC-Connected mode with the eNB; and
  transmit the ITR message to the eNB.

22. The one or more non-transitory computer-readable media of claim 21, wherein the ITR message is a first ITR message, and wherein the instructions, when executed, further cause the MME to:
  receive a second ITR message to indicate that the inactivity timer associated with the UE is to be suspended;
  identify that the UE is in the RRC-Connected mode with the eNB at a time of receipt of the second ITR message; and
  transmit the ITR message to the eNB based on the identification that the UE is in the RRC-Connected mode.

23. The one or more non-transitory computer-readable media of claim 21, wherein the instructions, when executed, further cause the MME to:
  determine that the eNB has kept the inactivity timer active after receiving the ITR message;
  transmit, responsive to the determination that the eNB has kept the inactivity timer active, another ITR message to the eNB after a pre-determined time period.

* * * * *